United States Patent
Jiang et al.

(10) Patent No.: US 12,477,550 B2
(45) Date of Patent: Nov. 18, 2025

(54) ARCHITECTURE FOR SIGNALING RESPONSE COORDINATION

(71) Applicant: ZTE Corporation, Guangdong (CN)

(72) Inventors: Chuangxin Jiang, Shenzhen (CN); Zhaohua Lu, Shenzhen (CN); Bo Gao, Shenzhen (CN); Shujuan Zhang, Shenzhen (CN); Hao Wu, Shenzhen (CN); Ke Yao, Shenzhen (CN); Yu Pan, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 812 days.

(21) Appl. No.: 17/854,278

(22) Filed: Jun. 30, 2022

(65) Prior Publication Data

US 2022/0338237 A1 Oct. 20, 2022

Related U.S. Application Data

(63) Continuation of application No. PCT/CN2020/087955, filed on Apr. 30, 2020.

(51) Int. Cl.
*H04W 72/23* (2023.01)
*H04L 5/00* (2006.01)

(52) U.S. Cl.
CPC ........... *H04W 72/23* (2023.01); *H04L 5/0053* (2013.01)

(58) Field of Classification Search
None
See application file for complete search history.

(56) References Cited

U.S. PATENT DOCUMENTS

| | | | |
|---|---|---|---|
| 2019/0239187 A1 | 8/2019 | Islam et al. | |
| 2019/0254061 A1* | 8/2019 | Manolakos | H04L 5/0051 |
| 2019/0297603 A1 | 9/2019 | Guo et al. | |
| 2019/0357224 A1 | 11/2019 | Li et al. | |
| 2020/0107345 A1* | 4/2020 | Ang | H04W 72/23 |
| 2020/0275436 A1 | 8/2020 | Lin et al. | |
| 2021/0392584 A1* | 12/2021 | Reial | H04W 76/28 |
| 2022/0217748 A1* | 7/2022 | Seo | H04L 5/0092 |
| 2022/0312452 A1* | 9/2022 | Frenne | H04L 5/005 |
| 2022/0353893 A1* | 11/2022 | Choi | H04L 5/001 |

FOREIGN PATENT DOCUMENTS

| | | |
|---|---|---|
| CN | 110535614 A | 12/2019 |
| WO | WO 2019/095271 A1 | 5/2019 |
| WO | WO 2019/246451 A1 | 12/2019 |

(Continued)

OTHER PUBLICATIONS

U.S. Appl. No. 62/888,187 Provisional Application (Year: 2019).*

(Continued)

*Primary Examiner* — Andre Tacdiran
(74) *Attorney, Agent, or Firm* — Crowell & Moring LLP (57) ABSTRACT

User equipment (UE) may communicate with a basestation (e.g., a gNodeB) via multiple transmit-receive points. The basestation may send multiple redundant or partially redundant DCIs (downlink channel information). The redundant DCIs may trigger redundant signaling responses. The UE may access predetermined content within the DCI to determine coordination of responses such that signaling response redundancy is avoided.

20 Claims, 6 Drawing Sheets

(56) References Cited

FOREIGN PATENT DOCUMENTS

| WO | WO 2020/034430 A1 | 2/2020 |
|---|---|---|
| WO | WO 2020/056180 A1 | 3/2020 |

OTHER PUBLICATIONS

Extended European Search Report for corresponding application No. EP 20895374.5 dated Mar. 14, 2023, 9p.
Huawei et al., "Discussion on PDSCH performance requirements for multi-DCI based multi-TRP transmission", 3GPP TSG-RAN WG4 Meeting #94Bis-e, electronic meeting, R4-2003685, Apr. 30, 2020, 4p.
AT&T, "Single and Multi DCI NC-JT Framework for Multi TRP Transmission in NR", 3GPP TSG-RAN WG1 Meeting #88, R1-1702259, Feb. 17, 2017, 4p, GR.
International Search Report for priority application No. PCT/CN2020/087955 dated Jan. 27, 2021, 2p, in English language.
Written Opinion for priority application No. PCT/CN2020/087955 dated Jan. 27, 2021, 3p, in English language.
Qulacomm Incorporated, "PDDCH-based power saving channel design", 3GPP TSG-RAN WG1 Meeting #97, R1-1907294, May 17, 2019, Sections 1-2, 16p, US.
Samsung, "Remaining issued for PDDCH-based power saving signal/channel", 3GPP TSG RAN WG1 Meeting #99, R1-1912486, Nov. 19, 2019, Sections 1-2, 7p, US.
Office Action issue in Chinese Patent Application No. 202080095257.3 dated Jun. 26, 2024, w/English translation, 18 pages.
CATT, "Summary of PDCCH-based Power Saving Signal/Channel", 3GPP TSG RAN WG1 Meeting #100e, R1-2001137, Feb. 21, 2020, 16p, Greece.
CATT, "Preparation Phase Summary of PDCCH-based Power Saving Signal/Channel", 3GPP TSG RAN WG1 Meeting #100e, R1-2001190, Feb. 21, 2020, 17p.
CATT, "Summary of Phase 1 Discussion on PDCC-based Power Saving Signal/Channel", 3GPP TSG RAN WG1 Meeting #100e, R1-2001248, Feb. 21, 2020, 21p.
CATT, "Summary of open issues for PDCCH", 3GPP TSG RAN WG2 Meeting #109e, R1-2001913, Feb. 28, 2020, 39p, Elbonia.
Huawei et al., "Feature lead summary #1 on PDCCH enchancements", 3GPP TSG RAN WG1 Meeting #100e, R1-2001044, Feb. 28, 2020, 38p.
Huawei et al., "Feature lead summary #2 on PDCCH enhancements", 3GPP TSG RAN WG1 Meeting #100e, R1-2001164, Feb. 28, 2020, 43p.
Nokia et al., "Maintenance of Rel-16-URLLC PDCCH enhancements", 3GPP TSG RAN WG1 Meeting #100e, R1-2000432, Mar. 6, 2020, 28p.
OPPO, "PDCCH enhancement for URLLC", 3GPP TSG RAN WG1 Meeting #100e, R1-2000479, Feb. 28, 2020, 17p, Greece.
Vivo, "Maintenance of PDCCH-based power saving signal", 3GPP TSG RAN WG1 Meeting #100e, R1-2000337, Mar. 6, 2020, 18p.
Communication Pursuant to Article 94(3) EPC issued in EP Application No. 20 895 374.5-1206 dated Mar. 26, 2025 (6 pages).
korean Office Action with English translation, dated Jun. 10, 2025, issued in Korean Patent Application No. 10-2022-7022490 (9 pages).
Nokia et al., "Corrections on Cross-carrier Scheduling with Different Numerologies", 3GPP TSG-RAN WG1 Meeting #100, R1-2001443, Mar. 6, 2020, (10 pages).
NTT DOCOMO INC., "Summary #2 on UE feature related discussion", 3GPP TSG RAN WG1 #99, Reno, USA, Nov. 18-22, 2019, R1-1913348, (53 pages).

\* cited by examiner

ARCHITECTURE FOR SIGNALING RESPONSE COORDINATION

This application is a continuation of International Application No. PCT/CN2020/087955, filed Apr. 30, 2020, the entirety of which is hereby incorporated by reference.

TECHNICAL FIELD

This disclosure relates to an architecture for downlink channel information signaling response coordination.

BACKGROUND

Wireless communication technologies are moving the world towards a rapidly increasing network connectivity. High-speed and low-latency wireless communications rely on efficient network resource management and allocation between user mobile stations and wireless access network nodes (including but not limited to wireless base stations). Unlike traditional circuit-switched networks, efficient wireless access networks may not rely on dedicated user channels. Instead, wireless network resources (such as carrier frequencies and transmission time slots) for transmitting voice or other types of data from mobile stations to wireless access network nodes may be allocated using information transmitted on the channels themselves.

DETAILED DESCRIPTION

In various telecommunications systems, multiple transmit-receive points (TRPs) may communicate with a single user equipment (UE). The physical downlink control channel may be signaled using multiple downlink channel information (DCIs). Accordingly, if transmission of one DCI is blocked, others of the multiple DCIs may be received and allow scheduling of signaling. In other words, multiple DCIs can be used to trigger the same signal. In some cases, different redundant DCIs may be sent via different TRPs. Accordingly, the UE may successfully receive the relevant DCI if the UE has unblocked transmission from any one (or more) of the multiple different TRPs. This may provide a technical solution improving the technical problem of physical downlink control channel (PDCCH) reliability.

In some implementations, predetermined content of the multiple DCIs may be used to coordinate the signaling set responsive to the multiple (and, in some cases, redundant) DCIs. For example, the predetermined content may be used to indicate a timing offset that may have a correspondence to the DCI the predetermined content is received within. Thus, each of the different DCIs may have a corresponding timing offset such that responses to each of the DCIs may be coordinated (e.g., scheduled) in time. For example, to avoid redundant response signaling, identical (or otherwise redundant) response signaling triggered multiple ones the individual DCIs may be coordinated such that each of the redundant responses is scheduled for transmission in the same timeunit. Accordingly, the redundant response may be transmitted once instead of once for each of the multiple DCI triggerings.

In some implementations, the predetermined content may meet a similarity condition that may be identifiable by the UE. When the similarity condition is met among multiple DCIs, the UE may determine to omit signaling responses for all but one (or a subset) of the DCIs.

The above may provide a technical solution to the technical problem of time-domain and frequency-domain resource waste as a result of redundant response signaling.

Figure 1:
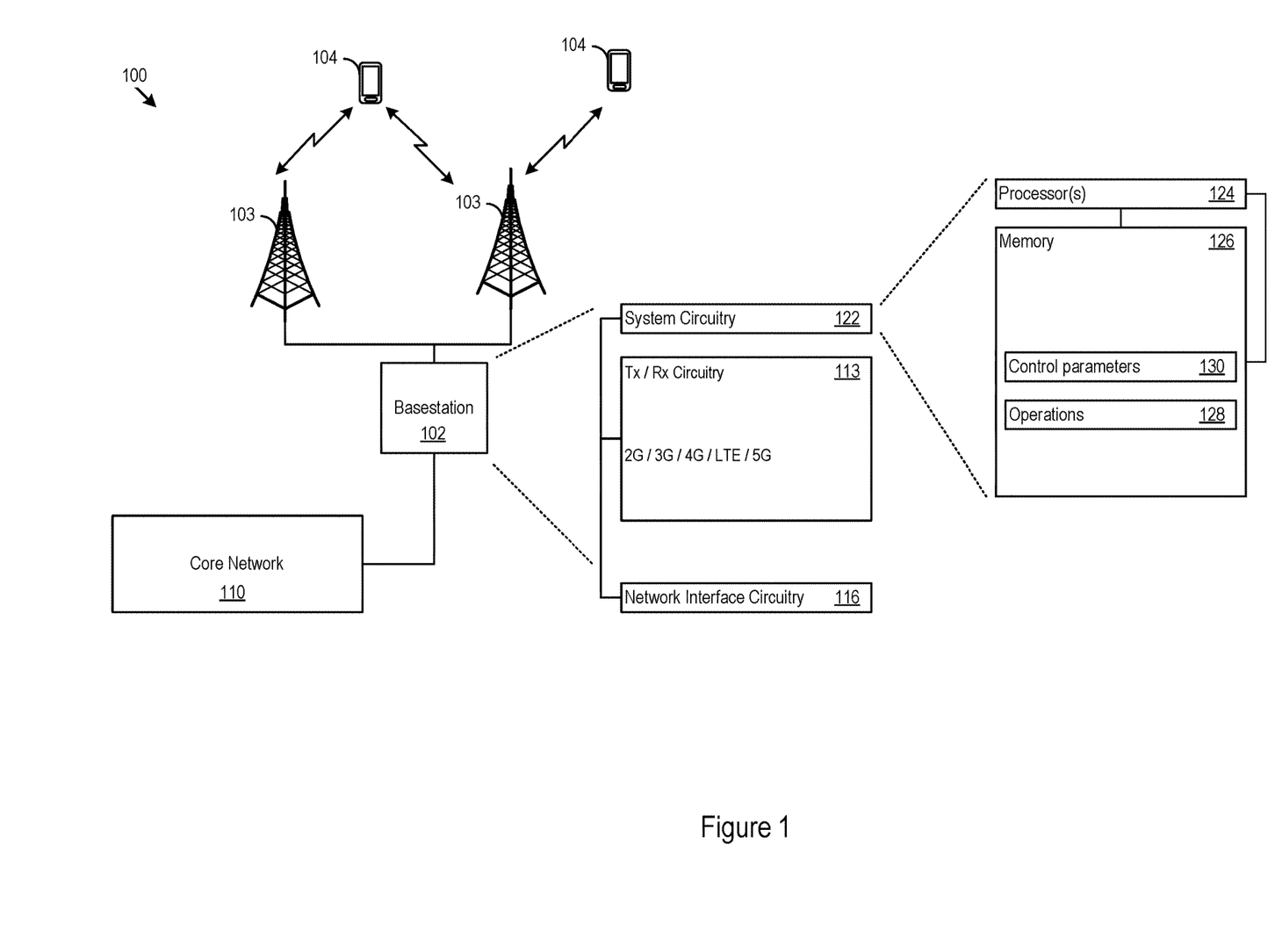
FIG. 1 shows an example basestation.

FIG. 1 shows an example basestation 102. The example basestation (e.g., a gNodeB (gNB)) may use one or more TRPs 103 and include radio Tx/Rx circuitry 113 to receive and transmit with UEs 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle DCI transmission to a UE. The control parameters 130 may include parameters or support execution of the operations 128. For example, control parameters may include network protocol settings, DCI format rules, bandwidth parameters, radio frequency mapping assignments, and/or other parameters.

Figure 2:
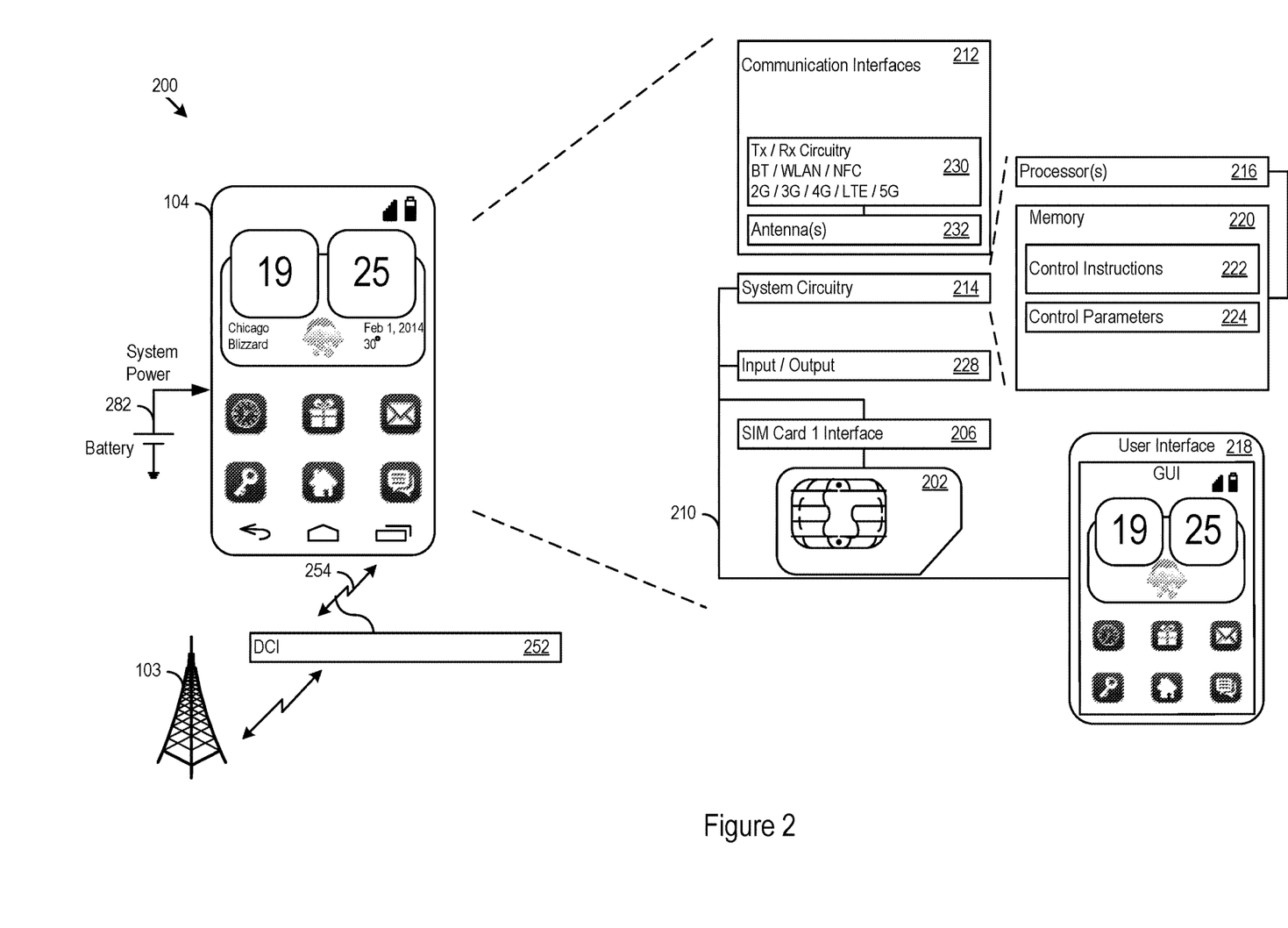
FIG. 2 shows an example communications environment.

FIG. 2 shows an example communications environment 200. In the communications environment 200, a UE 104 may communicate with a basestation via TRP 103 to receive a DCI 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The UE 104 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/ output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212.

In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Figure 3:
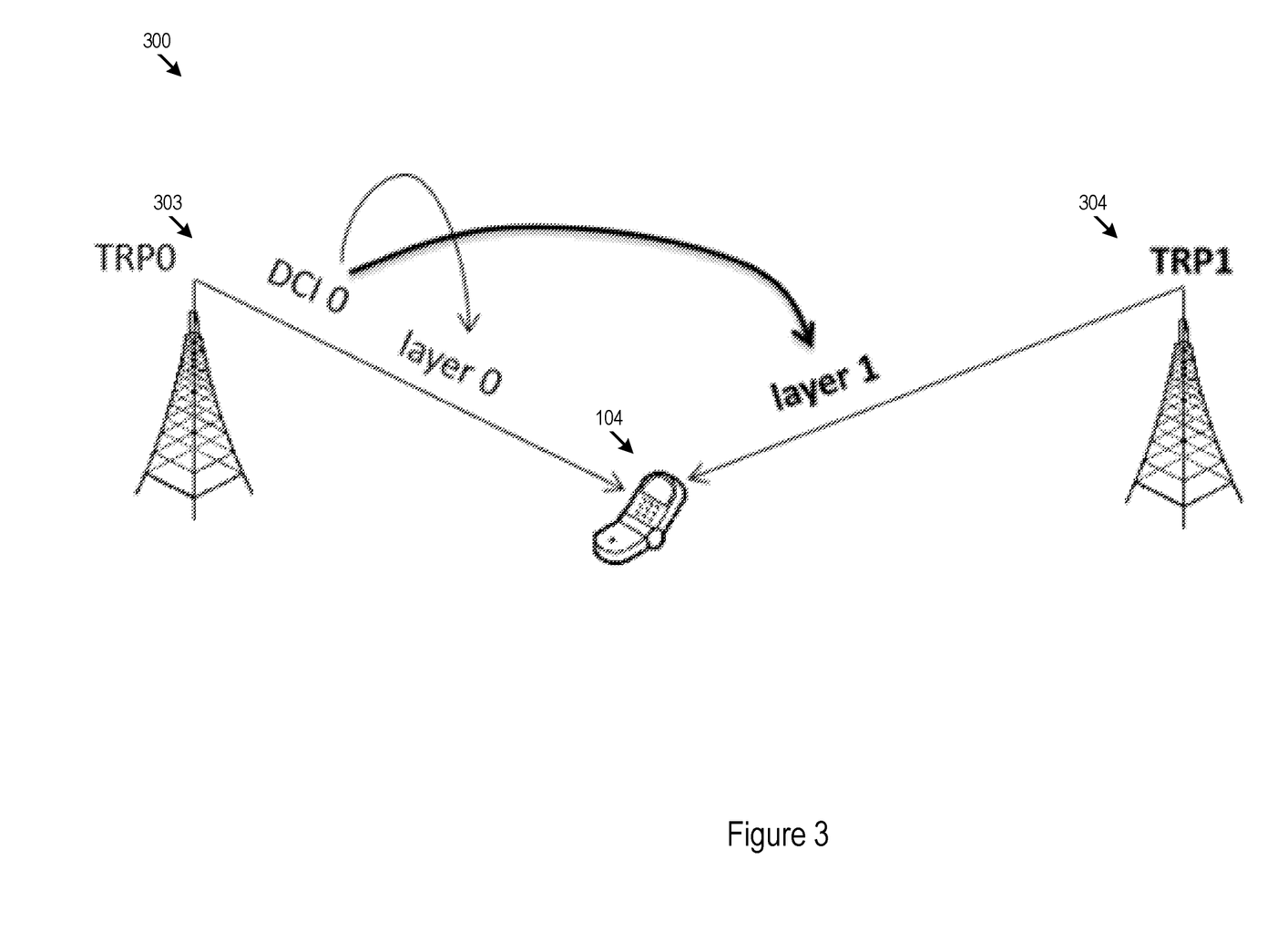
FIG. 3 shows an example multiple transmit-receive point (TRP) environment.

FIG. 3 shows an example multiple TRP environment 300. In example multiple TRP environment 300, two TRPs 303, 304 transmit (e.g., communications for multiple layers) to a UE 104 at a given time. For example, layer 0 is transmitted from TRP0 303 and layer 1 is transmitted from TRP1 304. To support backhaul between TRP0 303 and TRP1 304, a single DCI (e.g., DCI 0) may be used to schedule a physical downlink shared channel (PDSCH) spanning the multiple layers (e.g., from both TRPs). The single DCI may be either be transmitted from TRP0 or TRP1. Even if layer(s) from one of two TRPs are blocked, the PDSCH may still be detected correctly if layer transmission from the other TRP is not blocked. Therefore, transmission of the PDSCH from multiple TRPs may increase the reliability of the PDSCH.

However, if the single DCI is blocked, the UE 104 may not necessarily correctly decode the PDSCH. The DCI is used to inform UE the scheduling information of the PDSCH, such as time/frequency resource location, Modulation and Coding Scheme (MCS), and/or other scheduling information. Accordingly, multiple-TRP-style reliability for the PDSCH is dependent on the presence of similar reliability for the PDCCH (e.g., DCI reception). Thus, the UE 104 may include the capability to receive and coordinate responses to multiple DCIs.

Figure 4:
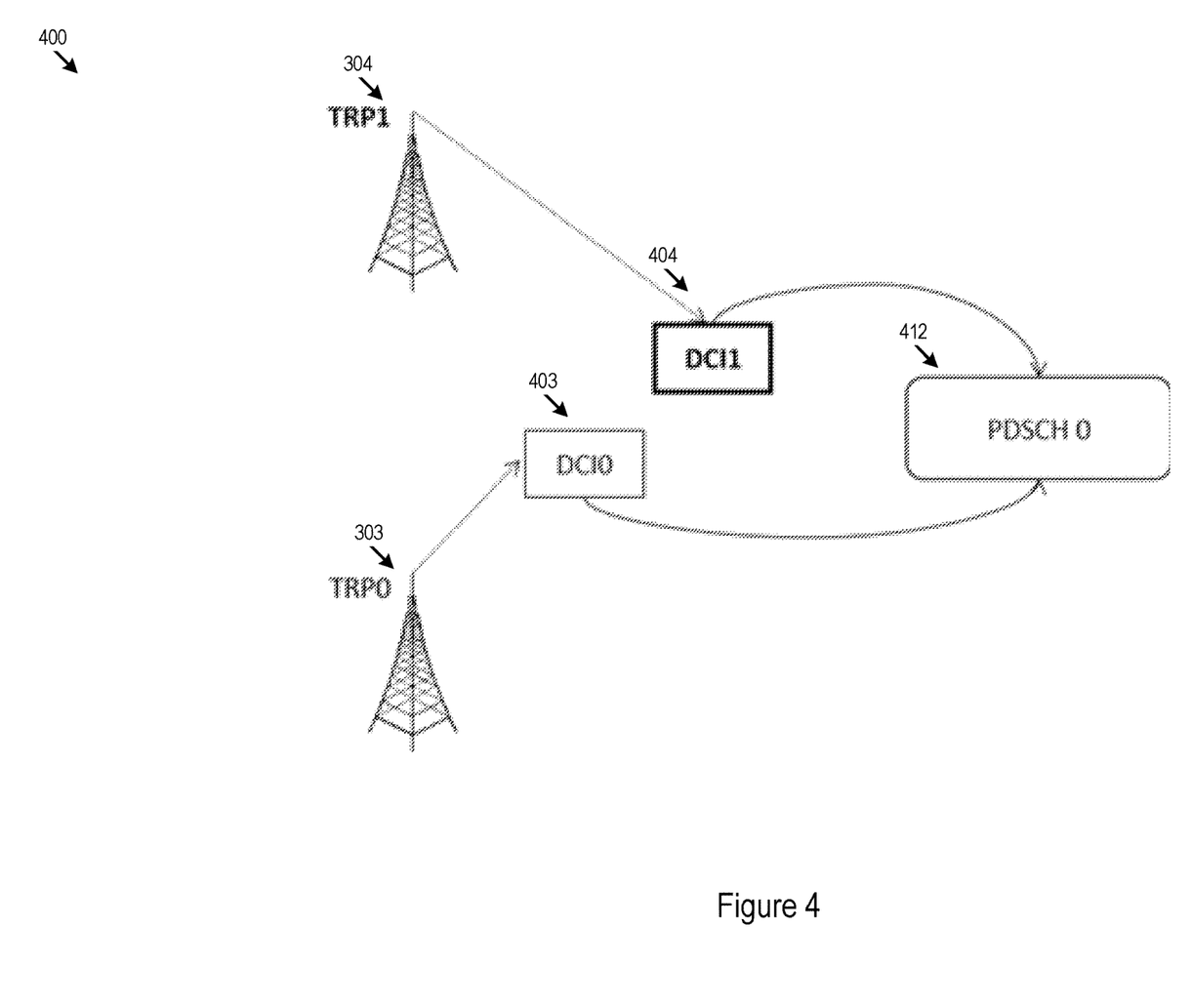
FIG. 4 shows a second example multiple TRP environment.

In some implementations, PDCCH reliability may be increased via redundancy. FIG. 4 shows a second example multiple TRP environment 400. In the second example DCI 0 403 and DCI 1 404 are transmitted from TRP0 303 and TRP1 404 respectively, they are both used to schedule PDSCH0 412. In this case, multiple PDCCHs which are used to schedule the same PDSCH can be configured with independent TCI states, where one TCI state corresponds to one beam. Even if only one beam is not blocked, PDSCH0 412 may be successfully decoded. Similarly physical uplink shared channel scheduling (or any other signaling scheduling handled by the PDCCH) may have its reliability increased. For example, sounding reference signaling (SRS) request scheduling and/or channel state information (CSI) scheduling may have its reliability increased. In some cases, common DCI signaling may be supported using the redundancy as discussed herein. Accordingly, slot format indicators, pre-emption indication, transmission power control (TPC) commands, cancellation indication, and other signal scheduling may have increased reliability.

In an illustrative scenario, an SRS request in a DCI in timeunit n (e.g., a specific DCI in a specific timeunit) includes request to trigger one or more SRS resource sets. The UE receiving the DCI will transmit a triggered SRS resource or resource set in timeunit n+k, where k is configured by higher layer signaling (e.g., a layer above the physical layer in a communications stack, such as the radio resource control (RRC) layer or the media access control element (MACCE) layer). "k" may refer to a signal time offset defined for the content of the signaling response. For example, k may be constant for a given SRS resource and/or SRS resource set, but different other signaling triggered by a DCI such as CSI signaling. Because k may be defined by higher layer signaling, in some implementations, k may be determined independently of predetermined content of the DCI that may be used to coordinate (e.g., through response scheduling or response omission) redundant signaling responses. The DCI may communicate values set via higher layer signaling, but such values may not necessarily be available for adjustment for signaling scheduling coding purposes. A timeunit may refer to a timeslot, symbols, multiple time/frequency resources, an effective timeslot for information transmitted over multiple timeslots, or other time measure for a DCI and/or signaling response.

However, in some cases, DCI 0 and DCI 1: (A) may be transmitted in different timeunits, e.g. in timeunit n (e.g., a specific timeunit) and timeunit n+j (a particular timeunit different from the specific timeunit), respectively; (B) may both trigger the same SRS resource set(s), and (C) may both be received correctly by the UE. In such cases, the UE may transmit a triggered SRS resource or resource set in both timeunit n+k and n+j+k, respectively. This may cause redundant SRS transmission. For these illustrative scenarios, n, j, and k may be non-negative integers.

In some implementations, the redundant SRS transmission may be avoided.

In some implementations, as discussed above, signaling responses may be coordinated among the multiple DCIs (e.g., via differentiated scheduling accounting for disparate arrivals of the multiple DCIs). In other words, the total timeunit offset between a DCI and a scheduled signaling response (e.g., such as an SRS transmission) may be based on predetermined content within the DCI (e.g., "information B" within the DCI). The predetermined content within the DCI may include various type of PDCCH information. For example, as discussed above, in some cases, different redundant DCIs may have different TCIs to account for their transmission from geographically distinct TRPs. Accordingly, the different TCIs may include different offsets corresponding to different DCIs. In some implementations, the predetermine content includes configurations for CORESET and/or configurations for search space. In other words, the predetermined content may include: beam information: TCI and/or spatial relation used for the PDCCH; time domain resource used by the PDCCH: PDCCH occasion index or slot index or symbol index used by the PDCCH; CORESET pool index configured per each CORESET; and/or other PDCCH information.

In an example implementation, a corresponding timeunit offset (e.g., a specific offset for a specific DCI) may be assigned for each redundant DCI. Below, an example scenario with two slot offsets is discussed. However, the techniques and architectures can be applied to any number of DCIs and corresponding offsets. The corresponding offset for each DCI may be determined using the predetermined content (e.g., information B) within the DCI.

In an illustrative example, corresponding offsets for two DCIs (e.g., a specific DCI and a particular DCI) is determined using beam information. In the example, two timeunit offsets are configured for each signaling response resource set, k(0)=6, k(1)=5. Based on predetermined configuration of the UE, use of TCI0 for a DCI results in a timeunit offset of k(0), and use of TCI1 for a DCI results in a timeunit offset of k(1). As set out above, DCI0 transmits in timeunit n and DCI1 transmits in timeunit n+j. Accordingly, for the case where j=1, TCI0 is used by DCI0, and TCI1 is used by DCI1 redundant signaling response transmission in reference to the DCIs may be avoided because the UE may schedule responses to both DCI0 and DCI1 in timeunit n+6. Other timeunit values may be used.

In an illustrative example, the timeunit offset is based on the time domain resources used by DCI. In the example, DCIs may be placed into two offset groups based on the parity of the timeunit in which the DCI is transmitted. For instance, two slot offsets are configured for each SRS resource set, k(0)=6, k(1)=5. If a DCI is transmitted in an even slot, it is assigned k(0). If a DCI is transmitted in an odd slot, it is assigned k(1). Groups may be assigned by the function, mod(timeunitDCI, G), where timeunitDCI is the timeunit in which the DCI is transmitted and G is the number of groups.

An illustrative example is based on a CORESET pool index configured per TRP. The timeunit offset is based on the CORESET pool index wherein each CORESET pool index corresponds to one TRP. In the example, two slot offsets can be configured for each signal response resource or resource set, and the UE will choose one based on the CORESET pool index configured for the DCI which schedules the SRS.

In various implementations, a timeunit offset T can be configured or predefined for different predetermined content within the DCI. The total timeunit offset between DCI and signaling response may be based on the additional slot offset T and the legacy signal timeunit offset k (which may be assigned based on the signaling content) configured per SRS resource or resource set. In other words, the total timeunit offset is k+T.

For example, assuming an additional slot offset T0=0 for TCI0, assuming an additional slot offset T1=−1 for TCI1, and assuming the configure slot offset T0 for a SRS resource set is k=6, the total offset for TCI1 would be 5 and the total for TCI0 would be 6. When DCI0 with TCI0 and DCI1 with TCI1 are transmitted in slot n and n+1, both of them will trigger the SRS resource set transmitting in slot n+6. Accordingly, redundant DCI response signaling is avoided.

In various implementations, the techniques and architectures discussed herein may be applied to various DCI response signaling. For example, DCI response coordination may be applied to time related information indicated by DCI. For example, the time offset between the DCI and PDSCH/PUSCH responses may be configured, such as, the time offset between the DCI and a triggered RS, or the time offset between the DCI and a triggered CSI report. The time offset T2 between PDCCH and data (including PDSCH and PUSCH) is indicated by a time domain resource assignment (TDRA) field in a DCI. Accordingly an additional time offset T1 as discussed above can be used to adjust T2. Alternatively, a custom T2 may be configured using the predetermined content of the DCI similar to the k(0) and k(1) values discussed above. These techniques may be applied to virtually any signaling response offset. The signaling response can include any of or any combination of the PDSCH, PUSCH, CSI-RS, SRS, CSI report, and other signals indicated/triggered by a DCI.

In some implementations, the predetermined content may meet a similarity condition (e.g., a condition A) that may be identifiable by the UE. When the similarity condition is met among multiple DCIs, the UE may determine to omit signaling responses for all but one (or a subset) of the DCIs. For example, the similarity condition may include identical (or similar, e.g., consecutive values in series or other predetermined level of similarity) values within the predetermined content. For example, a hybrid automatic repeat request (HARQ) processing number, new data indicator (NDI), Time and frequency resources allocated by DCI, or a combination of these may make up the predetermined content within the DCI. The similarity condition for multiple DCIs may be met when the multiple DCIs have identical (or similar) values for the predetermined content. For example, three out of four received DCIs may meet the similarity condition. Accordingly, the UE would omit responses for two of the three matched DCIs and provide response signaling for the other two DCIs.

In an illustrative example, if a UE receives two DCIs which meet a similarity condition based on their predetermined content, the UE will only transmit response signaling (such as an SRS) for the first DCI received. Referring now to, DCI0 and DCI1, discussed above, DCI0 and DCI1 trigger responses in timeunit n+k and timeunit n+j+k, respectively. In this case, the UW transmits in timeunit n+k and omits the signaling response in timeunit n+j+k. Alternatively, the UE may be configured to transmit in response to the second DCI received. In the scenario above, the UE would omit its response in the timeunit n+k and transmit a signaling response in timeunit n+j+k. For larger groups of DCIs meeting the similarity condition, the UE may be configured to respond to the third, fourth, . . . , nth DCI. In some cases, the UE may be configured to respond to the last received DCI meeting the similarity condition. In some cases, the selection of the DCI used may be predefined or configured by using RRC signaling or other higher layer signaling.

The predetermined content can include various DCI parameters, for instance, including any parameters in DCI except the Downlink assignment index (DAI). Optionally, the predetermined content may include all parameters in the DCI except Downlink assignment index (DAI), Time domain resource assignment (TDRA) and/or Carrier indicator.

For type II HARQ codebook determination, the DAI may be used to determine ACK/NACK order and the number of bits. Therefore, the DAI in two DCIs may be different for DCI0 and DCI1. Accordingly, the UE may send feedback ACK/NACK bits for both DCI0 and DCI1 (even in cases where another signaling response for one of the two DCIs was omitted responsive to the similarity condition being met).

In some cases, only one of two redundant DCIs may be correctly received by the UE. Where the UE only receives one of the two, the basestation (e.g., gNB) may not necessarily which was received prior to a signaling response from the UE. Accordingly, in the example with DCI0 and DCI1, the UE would transmit a signaling response in timeunit n+k or n+j+k, but the basestation may not know which one. Accordingly, the basestation may listen (e.g., perform blind detection) twice: once in timeunit n+k and once in timeunit n+j+k.

Figure 5:
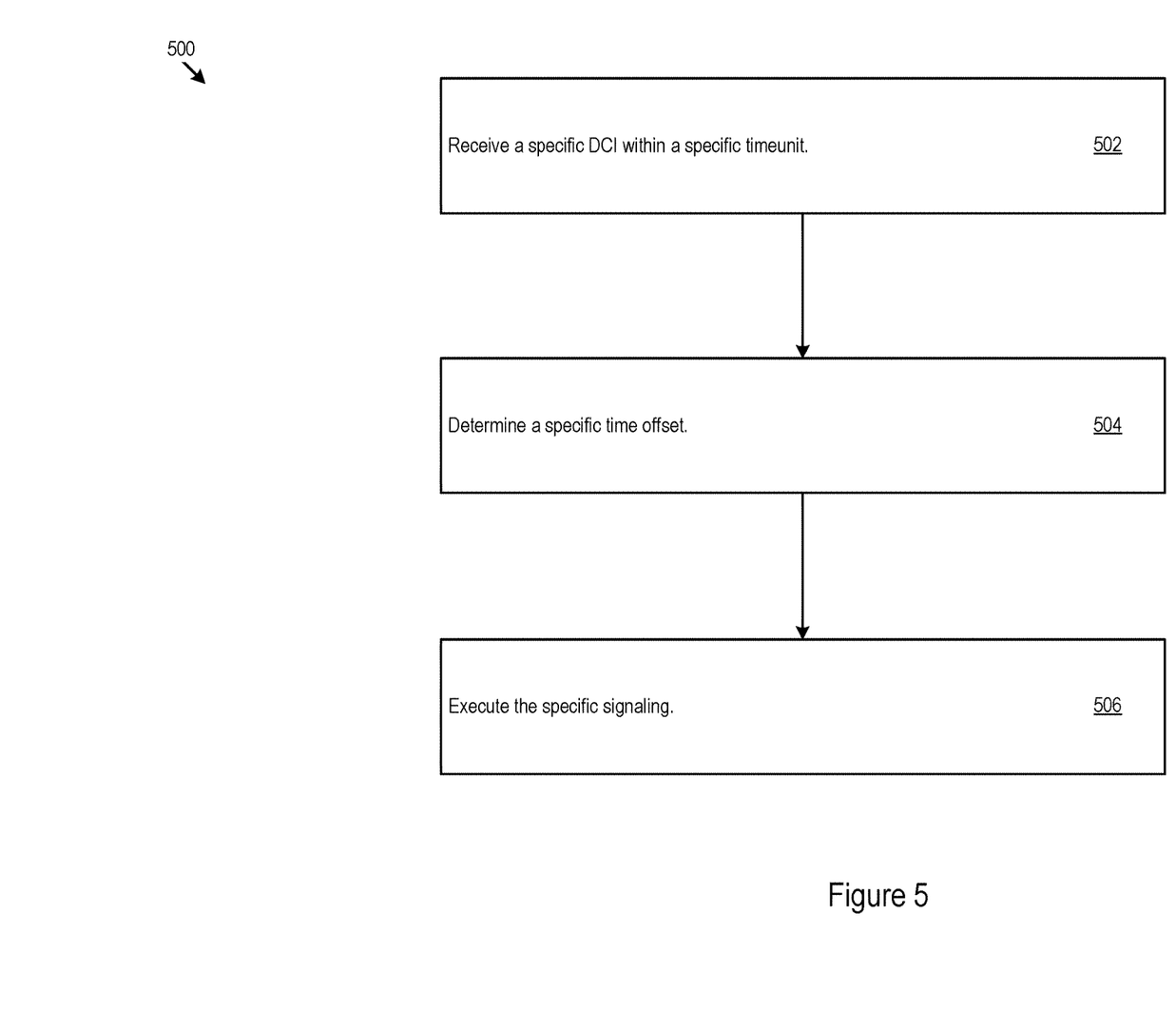
FIG. 5 shows example coordination logic.

FIG. 5 shows example coordination logic 500 for DCI signaling response coordination, which may be implemented on specifically configured circuitry (e.g., within the UE 104). The coordination logic 500 may receive a specific DCI within a specific timeunit (502). The coordination logic 500 may determine a specific time offset for the specific signaling based on predetermined content within the specific DCI (504). The coordination logic 500 may execute the specific signaling (506). In some implementations, the specific signaling may be executed in accord with the specific time offset and/or the specific timeunit.

Figure 6:
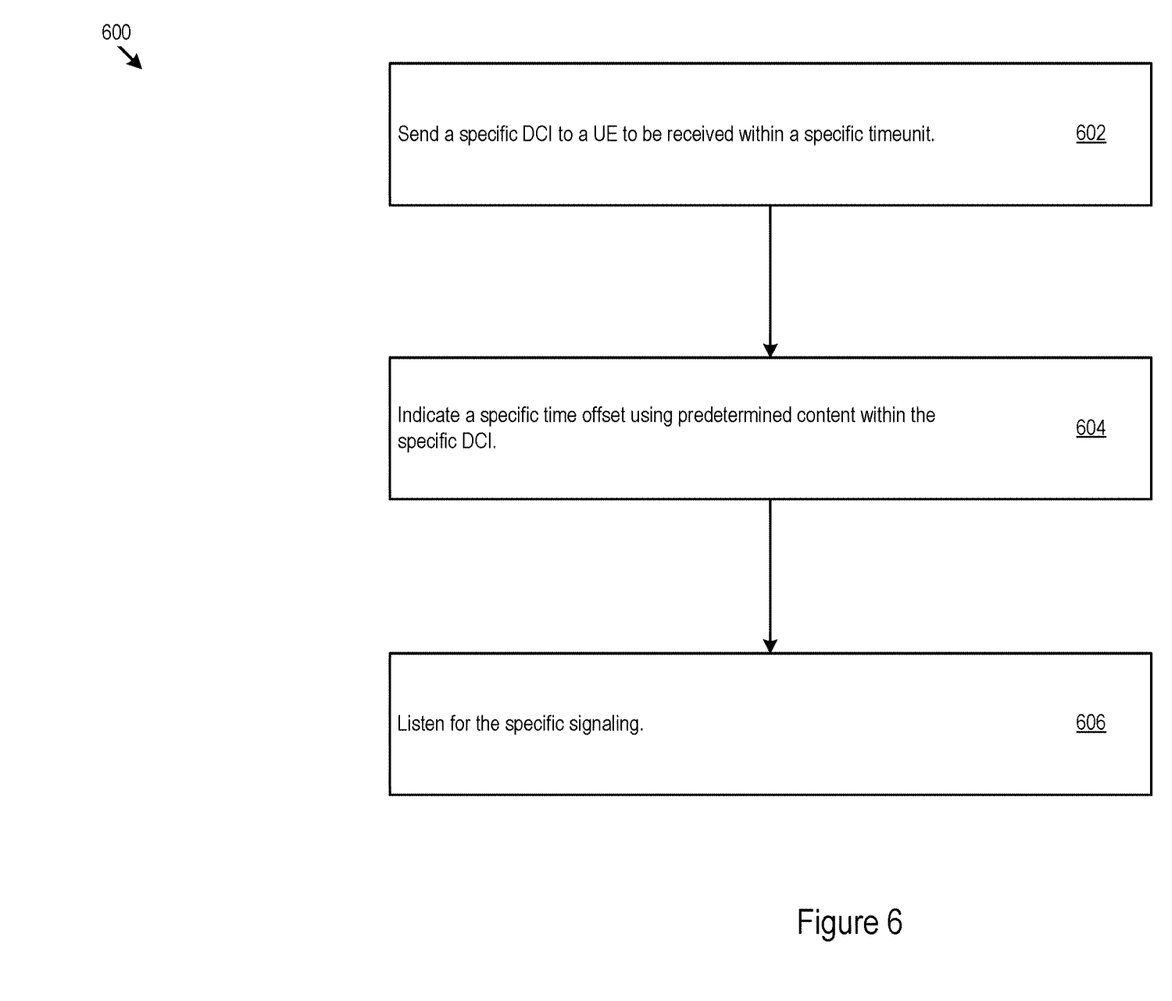
FIG. 6 shows example scheduling logic.

FIG. 6 shows example scheduling logic 600 for DCI signaling response coordination, which may be implemented on specifically configured circuitry (e.g., within the basestation 102). The scheduling logic 600 may send a specific DCI to a UE to be received in a specific timeunit (602). The specific DCI may be configured to schedule specific signaling. The scheduling logic 600 indicate a specific time offset using predetermined content within the specific DCI (604). The scheduling logic may listen for the specific signaling responsive to the DCI (606). In some implementations, the specific signaling may be scheduled in accord with the specific time offset and/or the specific timeunit.

Table 1 shows a listing of acronyms which may be used herein.

TABLE 1

| Acronym | Full Name |
| --- | --- |
| gNB | gNodeB |
| SRS | Sounding reference signal |
| CSI | Channel state information |
| PUCCH | Physical uplink control channel |
| FR | Frequency range |
| PRI | PUCCH resource indicator |
| TCI | Transmission configuration indicator |
| RRC | Radio resource control |
| MAC-CE | Medium access control (MAC) control element (CE) |
| UL | uplink |
| DL | downlink |
| CSS | Common search space |
| USS | UE specific search space |
| CA | Carrier aggregation |
| PMI | Precoding matrix indicator |
| MCS | Modulation and Coding Scheme |
| PDSCH | Physical downlink shared channel |
| PDCCH | Physical downlink control channel |
| CSI-RS | Channel state information reference signal |
| CRI | CSI-RS resource indicator |
| CQI | Channel quality indicator |
| DCI | Downlink control information |
| DAI | Downlink assignment index |
| TRP | Transmit-receive point |

TABLE 1-continued

| Acronym | Full Name |
| --- | --- |
| UCI | Uplink control information |
| SSB | SS/PBCH block |
| TB | Transport block |
| RV | Redundant version |
| UE | User equipment |
| TCP | Transmission power control |
| HARQ | Hybrid automatic repeat request |
| RBG | Resource block group |

The methods, devices, processing, circuitry, and logic described above and below may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in tangible storage media that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on other machine-readable media. The media may be made-up of a single (e.g., unitary) storage device, multiple storage devices, a distributed storage device, or other storage configuration. A product, such as a computer program product, may include storage media and instructions stored in or on the media, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
receiving, in a specific timeunit, specific downlink channel information (DCI) to schedule specific signaling;
receiving a particular DCI;
determining that the specific DCI and the particular DCI meet a similarity condition;
executing the specific signaling responsive to the specific DCI, wherein:
a specific time offset is determined based on predetermined content of the specific DCI or independently of the predetermined content; and
the specific signaling is scheduled in accord with the specific time offset; and
omitting a particular signaling response to the particular DCI, wherein omission of the particular signaling response is done in response to the specific DCI and the particular DCI meeting the similarity condition.

2. The method of claim 1, wherein the predetermined content comprises at least one of:
a first parameter to configure search space of the specific DCI, wherein the first parameter is defined at a layer above a physical layer;
a second parameter to configure a CORESET of the specific DCI, wherein the second parameter is defined at a layer above the physical layer;
a third parameter to configure a CORESET pool index of the specific DCI, wherein the third parameter is defined at a layer above the physical layer; or
any combination of the above.

3. The method of claim 1, wherein the predetermined content comprises:
beam information, wherein:
the beam information includes a transmission configuration index (TCI), a spatial relation used for the specific DCI, or both;
a time domain resource used by the specific DCI, wherein:
the time domain resource includes a physical downlink control channel (PDCCH) occasion index, a slot index, a symbol index used by the PDCCH, or any combination thereof, wherein
the PDCCH occasion index, the slot index, the symbol index used by the PDCCH, or any combination thereof are configured for a search space; and
a CORESET pool index configured for the CORESET of the specific DCI; or any combination of the above.

4. The method of claim 1, wherein a timeunit of specific signaling execution is determined based on the specific timeunit, the specific time offset, and a signal time offset defined for signaling content of the specific signaling, the timeunit of specific signaling execution comprising: an effective timeunit of the specific signaling, a transmission timeunit of the specific signaling, or both.

5. The method of claim 1, where a signaling content of the specific signaling comprises:
a sounding reference signal (SRS) scheduled by the specific DCI;
a channel state information reference signal (CSI-RS) scheduled by the specific DCI;
a physical downlink shared channel (PDSCH) scheduled by the specific DCI;
a physical uplink shared channel (PUSCH) scheduled by the specific DCI;
CSI reporting scheduled by the specific DCI;
a signaling indication scheduled by a group common DCI; or
any combination of the above.

6. The method of claim 1,
the specific DCI arrives before the particular DCI, in which case the specific DCI arrives in a specific timeunit preceding a particular timeunit in which the particular DCI arrives; or
the particular DCI arrives before the specific DCI, in which case the particular DCI arrives in the particular timeunit preceding the specific timeunit in which the specific DCI arrives.

7. The method of claim 1, wherein:
the similarity condition includes determining that the predetermined content within the specific DCI and the particular DCI are identical;
the predetermined content includes:
a hybrid automatic repeat request (HARD) processing number;
a new data indicator (NDI);
a time domain resource allocated for the specific signaling;
a frequency domain resource allocated for the specific signaling;
a carrier indicator;
a DCI parameter other than a downlink assignment index (DAI); or
any combination of the above; and
the specific DCI and the particular DCI are associated with different CORESET pool indices.

8. The method of claim 1, further including:
sending feedback acknowledgement/non-acknowledgement (ACK/NACK) bits for both the specific DCI and the particular DCI.

9. A method including:
sending specific downlink control information (DCI) to user equipment (UE) to be received in a specific timeunit, the specific DCI configured to schedule specific signaling;
sending a particular DCI to the UE, wherein the particular DCI and the specific DCI meet a similarity condition; and
listening for the specific signaling responsive to the DCI, wherein:
a specific time offset is indicated based on predetermined content of the specific DCI or independently of the predetermined content,
the specific signaling is scheduled in accord with the specific time offset, and
the specific DCI and the particular DCI are selected to meet the similarity condition to cause omission of a signaling response to the particular DCI.

10. The method of claim 9, wherein the predetermined content includes at least one of:
a first parameter to configure search space of the specific DCI, wherein the first parameter is defined at a layer above a physical layer;
a second parameter to configure a CORESET of the specific DCI, wherein the second parameter is defined at a layer above the physical layer;

a third parameter to configure a CORESET pool index of the specific DCI, wherein the third parameter is defined at a layer above the physical layer; or any combination of the above.

11. The method of claim 9, wherein the predetermined content includes:
   beam information, wherein:
      the beam information includes a transmission configuration indicator (TCI), a spatial relation used for the specific DCI, or both;
   a time domain resource used by the specific DCI, wherein:
      the time domain resource includes a physical downlink control channel (PDCCH) occasion index, a slot index, a symbol index used by the PDCCH, or any combination thereof, wherein
         the PDCCH occasion index, the slot index, the symbol index used by the PDCCH, or any combination thereof are configured for a search space; and
         a CORESET pool index configured for the CORESET of the specific DCI;
   or any combination of the above.

12. The method of claim 9, wherein a timeunit of specific signaling execution is determined based on the specific timeunit, the specific time offset, and a signal time offset defined for signaling content of the specific signaling, the timeunit of specific signaling execution including: an effective timeunit of the specific signaling, a transmission timeunit of the specific signaling, or both.

13. The method of claim 9, where a signaling content of the specific signaling includes:
   a sounding reference signal (SRS) scheduled by the specific DCI;
   a channel state information reference signal (CSI-RS) scheduled by the specific DCI;
   a physical downlink shared channel (PDSCH) scheduled by the specific DCI;
   a physical uplink shared channel (PUSCH) scheduled by the specific DCI;
   CSI reporting scheduled by the specific DCI;
   a signaling indication scheduled by a group common DCI; or
   any combination of the above.

14. The method of claim 9, wherein:
   the specific DCI arrives before the particular DCI, in which case the specific DCI arrives in a specific timeunit preceding a particular timeunit in which the particular DCI arrives; or
   the particular DCI arrives before the specific DCI, in which case the particular DCI arrives in the particular timeunit preceding the specific timeunit in which the specific DCI arrives.

15. The method of claim 9, wherein:
   the similarity condition includes the predetermined content within the specific DCI and the particular DCI being identical;
   the predetermined content includes:
      a hybrid automatic repeat request (HARD) processing number;
      a new data indicator (NDI);
      a time domain resource allocated for the specific signaling;
      a frequency domain resource allocated for the specific signaling;
      a carrier indicator;
      a DCI parameter other than a downlink assignment index (DAI); or
      any combination of the above; and
   the specific DCI and the particular DCI are associated with different CORESET pool indices.

16. The method of claim 9, further comprising:
   receiving feedback acknowledgement/non-acknowledgement (ACK/NACK) bits for both the specific DCI and the particular DCI.

17. A device including circuitry configured to perform steps comprising:
   receiving, in a specific timeunit, specific downlink channel information (DCI) to schedule specific signaling;
   receiving a particular DCI;
   determining that the specific DCI and the particular DCI meet a similarity condition;
   executing the specific signaling responsive to the specific DCI, wherein:
      a specific time offset is determined based on predetermined content of the specific DCI or independently of the predetermined content; and
      the specific signaling is scheduled in accord with the specific time offset; and
   omitting a particular signaling response to the particular DCI, wherein omission of the particular signaling response is done in response to the specific DCI and the particular DCI meeting the similarity condition.

18. The device of claim 17, wherein the steps further include:
   sending feedback acknowledgement/non-acknowledgement (ACK/NACK) bits for both the specific DCI and the particular DCI.

19. The device of claim 17, wherein the steps further include:
   receiving feedback acknowledgement/non-acknowledgement (ACK/NACK) bits for both the specific DCI and the particular DCI.

20. A device including circuitry configured to perform steps comprising:
   sending specific downlink control information (DCI) to user equipment (UE) to be received in a specific timeunit, the specific DCI configured to schedule specific signaling;
   sending a particular DCI to the UE, wherein the particular DCI and the specific DCI meet a similarity condition; and
   listening for the specific signaling responsive to the DCI, wherein:
      a specific time offset is indicated based on predetermined content of the specific DCI or independently of the predetermined content,
      the specific signaling is scheduled in accord with the specific time offset, and
      the specific DCI and the particular DCI are selected to meet the similarity condition to cause omission of a signaling response to the particular DCI.

* * * * *

UNITED STATES PATENT AND TRADEMARK OFFICE
CERTIFICATE OF CORRECTION

| | |
|---|---|
| PATENT NO. | : 12,477,550 B2 |
| APPLICATION NO. | : 17/854278 |
| DATED | : November 18, 2025 |
| INVENTOR(S) | : Chuangxin Jiang et al. |

It is certified that error appears in the above-identified patent and that said Letters Patent is hereby corrected as shown below:

In the Claims

In Column 10, Claim 6, Line 9, after "claim 1," insert --wherein--.

Signed and Sealed this
Thirtieth Day of December, 2025

John A. Squires
*Director of the United States Patent and Trademark Office*